(12) United States Patent
Sherman (10) Patent No.: US 9,039,987 B2
(45) Date of Patent: May 26, 2015

(54) MASS TRANSFER PACKING ELEMENT AND METHOD OF MAKING THE SAME

(75) Inventor: Daniel C. Sherman, Hudson, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 109 days.

(21) Appl. No.: 13/698,291

(22) PCT Filed: May 23, 2011

(86) PCT No.: PCT/US2011/037494
§ 371 (c)(1),
(2), (4) Date: Nov. 16, 2012

(87) PCT Pub. No.: WO2011/149802
PCT Pub. Date: Jan. 12, 2011

(65) Prior Publication Data
US 2013/0058843 A1    Mar. 7, 2013

Related U.S. Application Data

(60) Provisional application No. 61/348,299, filed on May 26, 2010.

(51) Int. Cl.
*B01J 19/30* (2006.01)
*B01J 8/02* (2006.01)
*B28B 11/16* (2006.01)
*B01J 19/00* (2006.01)
*B01J 19/24* (2006.01)
*B29C 47/00* (2006.01)
*B29C 47/12* (2006.01)
*B29K 709/02* (2006.01)
*B29L 31/60* (2006.01)

(52) U.S. Cl.
CPC .............. *B01J 8/0278* (2013.01); *B01J 19/30* (2013.01); *B01J 2219/30215* (2013.01); *B01J 2219/30223* (2013.01); *B01J 2219/30416* (2013.01); *B28B 11/16* (2013.01); *B29C 47/0028* (2013.01); *B29C 47/12* (2013.01); *B29C 2793/0027* (2013.01); *B29K 2709/02* (2013.01); *B29L 2031/60* (2013.01); *B29L 2031/608* (2013.01)

(58) Field of Classification Search
CPC ........ B01J 19/00; B01J 19/24; B01J 2219/00; B01J 2219/30; B01J 2219/302; B01J 2219/30219; B01J 2219/30296; B01J 2219/304; B01J 2219/30416; B01J 2219/318; B01J 2219/3188; B01J 19/30; B01J 19/305; B29C 47/00; B29C 47/0009; B29C 47/0028; B29C 47/0035; B29C 47/12; B29C 2793/00; B29C 2793/0009; B29C 2793/0027; B29C 2793/0063; B29K 2709/00; B29K 2709/02
USPC ................... 422/129, 211, 218; 261/75, 108; 264/138, 145, 148, 150
See application file for complete search history.

(56) References Cited

U.S. PATENT DOCUMENTS

| | | | | |
|---|---|---|---|---|
| 2,376,349 A | * | 5/1945 | Frischer | 261/94 |
| 2,571,958 A | * | 10/1951 | Slaughter et al. | 261/95 |
| 3,957,931 A | * | 5/1976 | Ellis et al. | 261/98 |
| 2006/0194019 A1 | * | 8/2006 | Niknafs et al. | 428/116 |
| 2009/0115077 A1 | * | 5/2009 | Niknafs et al. | 261/94 |
| 2011/0114288 A1 | * | 5/2011 | Miller | 165/67 |

FOREIGN PATENT DOCUMENTS

GB     2197597 A     5/1988
WO   WO 2010/005785 A2 *  1/2010

* cited by examiner

*Primary Examiner* — Natasha Young
(74) *Attorney, Agent, or Firm* — Stewart A. Fraser (57) ABSTRACT

A ceramic mass transfer packing element that includes a planar end surface which intersects an internal wall's geometric plane at an acute angle is disclosed. A process for making the packing element and an apparatus that uses the packing element are also disclosed.

26 Claims, 11 Drawing Sheets

MASS TRANSFER PACKING ELEMENT AND METHOD OF MAKING THE SAME

CROSS-REFERENCE TO RELATED APPLICATION

This application is a National Stage Application under 35 U.S.C. §371 of International Application Number PCT/US2011/037494, filed May 23, 2011 and published as WO 2011/149802 on Dec. 1, 2011, which claims the benefit to U.S. Provisional Application 61/348,299, filed May 26, 2010, the entire contents of which are incorporated herein by reference in its entirety.

BACKGROUND OF THE INVENTION

Packing elements for use in mass transfer applications within a chemical processing apparatus are well known. More particularly, a plurality of packing elements that are randomly oriented in a vessel in which two or more fluids are made to contact each other to facilitate processes such as decomposition, absorption, distillation and scrubbing of chemicals have been disclosed in numerous patents and patent applications, including: U.S. Pat. No. 5,304,423; U.S. Pat. No. 5,747,143, U.S. Pat. No. 6,007,915, WO 2008/086024 and WO2009/061719.

SUMMARY

The present invention provides packing elements and processes for making packing elements which enable a manufacturer of packing elements to readily tailor the performance characteristics of a chemical processing apparatus' packing elements by modifying separate, independently controllable characteristics of the packing elements during the manufacturing process. The ability to independently control physical characteristics of the packing elements enables the production of the packing elements disclosed herein.

In one embodiment, the present invention is a mass transfer packing element comprising a continuous peripheral wall that includes a first end and a second end. The peripheral wall surrounds a passageway through the element and the first end defines a first planar surface. A first internal wall, disposed within the passageway, defines a first geometric plane which intersects the first planar surface at an acute angle. The peripheral wall and the internal wall comprise ceramic material.

Another embodiment relates to a process for manufacturing mass transfer packing elements that may comprise the following steps. Providing a mixture of sinterable, ceramic materials. Extruding the mixture along a central axis to form an extrudate. The extrudate comprises a peripheral wall which surrounds a passageway therethrough. Dividing the extrudate into a plurality of uniformly to shaped packing elements by cutting the extrudate along cutting planes which intersect the central axis at an acute angle.

Yet another embodiment relates to a chemical processing apparatus comprising a vessel. The vessel comprises a first fluid entry point, a second fluid entry point, a fluid exit point and a bed of randomly oriented packing elements disposed between said first and second entry points. At least a majority of the packing elements each comprise a continuous peripheral wall comprising a first end and a second end. The peripheral wall surrounds a passageway through the element and the first end defines a first planar surface. A first internal wall, disposed within the passageway, defines a first geometric plane which intersects the first planar surface at an acute angle.

DETAILED DESCRIPTION

The phrase "mass transfer", when used herein, is defined as the technology for moving one species in a mixture relative to another, and it consists basically of two types of operations: separation of components from each other or mixing them together. The mixture, which may be referred to herein as a fluid, may be a gas or a liquid. For such applications, the mixture to be treated is often passed through a vessel containing randomly oriented packing elements which may be referred to herein as media. The packing elements are considered to be randomly oriented if they have been dumped into the vessel without attempting to place or otherwise physically restrain the final orientation of the packing elements in the vessel. While some randomly oriented packing elements are designed to preferentially orient during the dumping process, thereby causing some of the elements to prefer a more horizontal or vertical orientation than would be achieved if the elements were completely randomly oriented, the elements are still considered to be randomly oriented if the individual elements are not deliberately restrained during the loading process. In contrast, structured packing elements, which may resemble bundles of corrugated sheets, are placed in vertical alignment in a vessel. The labor costs and additional down time associated with loading the structured packing elements, relative to the costs and time required to load an equivalent amount of randomly oriented packing elements, increases the cost of operating the mass transfer process and therefore may be undesirable.

Conventional wisdom indicates that the most efficient mass transfer elements are those that present the largest surface area per unit volume to the fluid to be contacted. There have been many attempts to design randomly oriented packing elements with the geometric surface area maximized. However, experience has shown that other characteristics of the packing elements may be desirable and may be considered when manufacturing packing elements for use in large scale commercial operations where initial cost, operating cost, and replacement cost of the packing elements as well as the apparatus' operating efficiency may be factors. Other characteristics of the packing elements that may be considered include the cost of manufacturing the packing elements, the tendency for the packing elements to nest with one another, the density of the elements, and the pressure drop within the vessel caused by the packing elements. Pressure drop may be directly impacted by the individual packing element's open face surface area and intra-element porosity as well as the porosity between the packing elements. Balancing these requirements, which may be in competition with one another, to achieve an advantageous design may require considerable skill.

As used herein, a "ceramic material" is an inorganic, non-metallic solid prepared by the action of heat and subsequent cooling. A ceramic material may be: (1) an oxide, such as alumina or zirconia; (2) a non-oxide, such as graphite, carbides, borides, nitrides and silicides; or (3) a composite which may be a combination of oxides and non-oxides.

Figure 1:
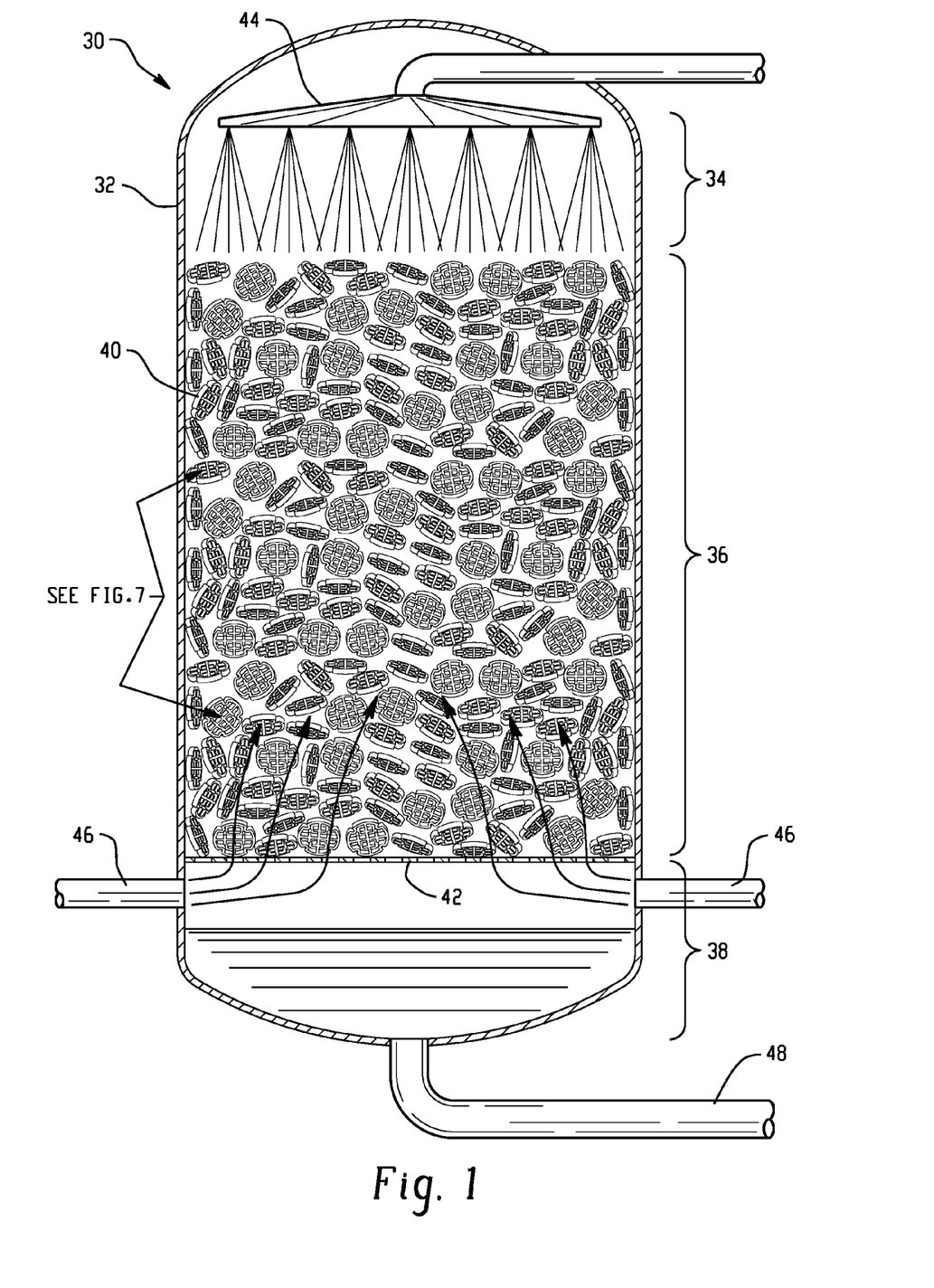
FIG. 1 is a cross-section of a chemical processing apparatus that includes packing elements according to one embodiment of this invention.

Referring now to the drawings, shown in FIG. 1 is a schematic drawing of an embodiment of a chemical processing apparatus 30 which could be used, for example, to produce sulfuric acid. In this embodiment, the processing apparatus includes vessel 32 which can be generally divided into reactant entry zone 34, reaction zone 36 and product collection zone 38. A plurality of randomly oriented packing elements 40, which may be referred to herein as a "bed" of to packing elements, is positioned within and substantially fills the reaction zone. The bed of packing elements is supported by porous screen 42 which has openings small enough to prevent passage of the packing elements and large enough to permit a liquid to easily flow therethrough. While the embodiment of FIG. 1 uses only packing elements according to an embodiment of this invention, a bed may employ mixtures of packing elements. In one embodiment, at least a majority of the elements are packing elements according to an embodiment of this invention.

Above the reaction zone is an entry zone for one of the reactants. A first reactant, such as an aqueous solution, enters the vessel and is distributed across the top of the bed of packing elements by distribution mechanism 44 which may be referred to herein as a first fluid entry point. As the reactant flows down and through the randomly oriented packing elements, a second reactant, such as a gas comprising $SO_3$, flows through gas inlet pipes 46, which may be referred to herein as a second fluid entry point, and into the lower portion of the bed of packing elements. As the $SO_3$ gas moves upwardly toward the top of the bed and the aqueous solution flows toward the bottom of the bed, at least a portion of the $SO_3$ is absorbed by the solution when the solution flows over and wets the surfaces of the packing elements. Sulfuric acid is formed when the $SO_3$ reacts with the solution. The sulfuric acid flows through the bed of packing elements, the porous support screen, and then collects in product collection zone 38. Discharge pipe 48 at the bottom of the collection zone functions as a fluid exit point and may be used to remove the sulfuric acid from the vessel.

Figure 2:
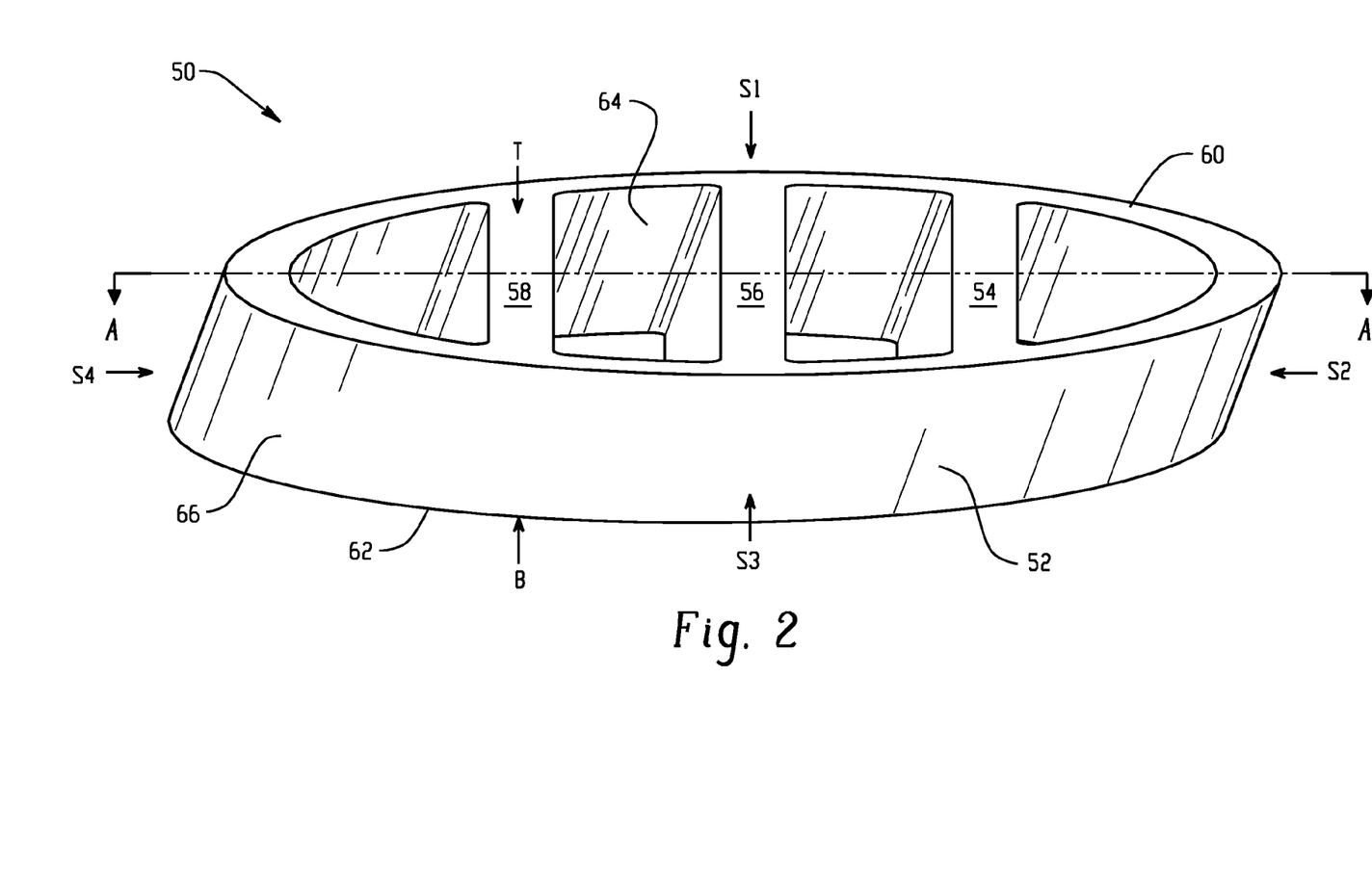
FIG. 2 is a perspective view of a packing element according to one embodiment of this invention.
Figure 3:
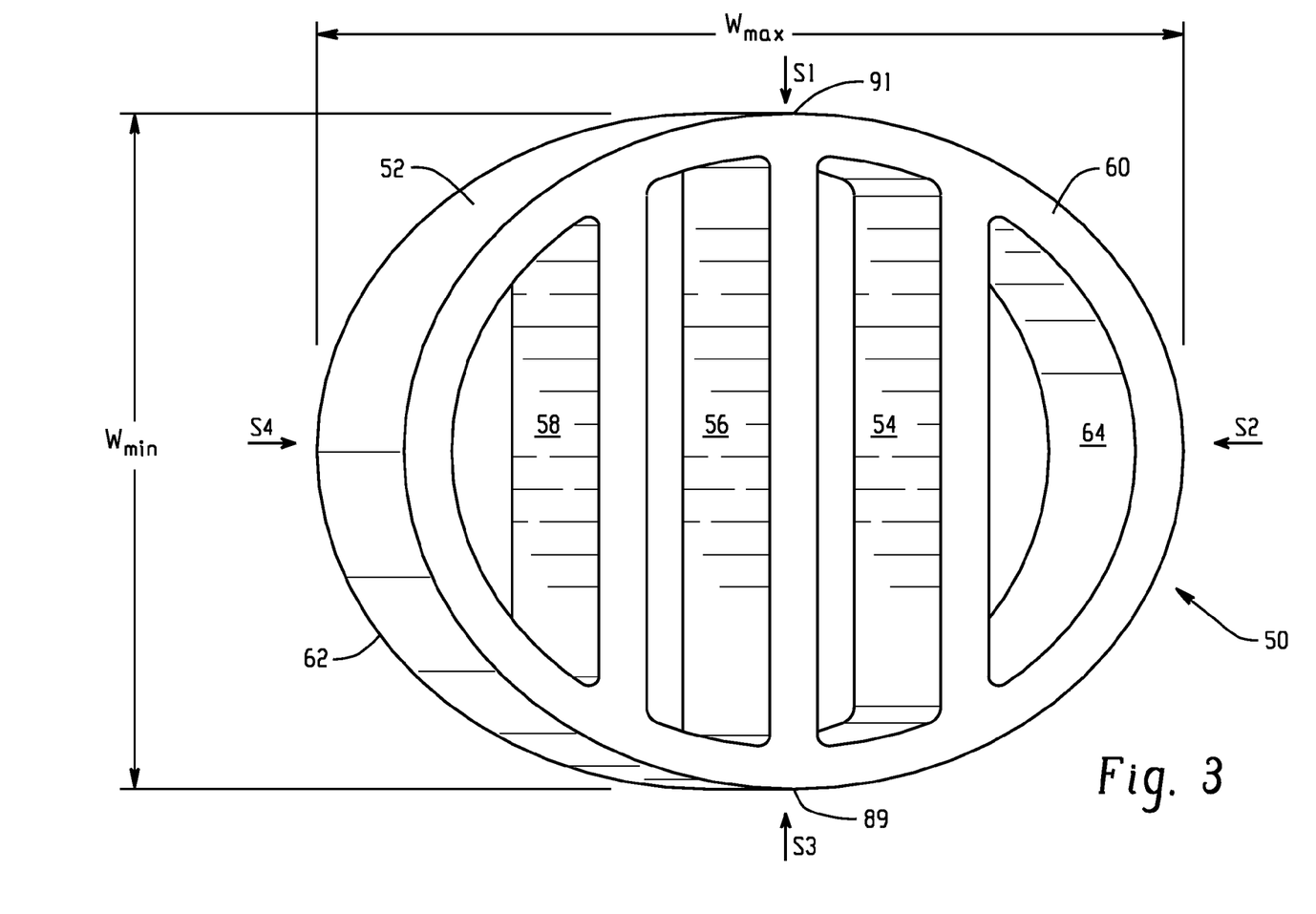
FIG. 3 is a top view of the packing element shown in FIG. 2.
Figure 4:
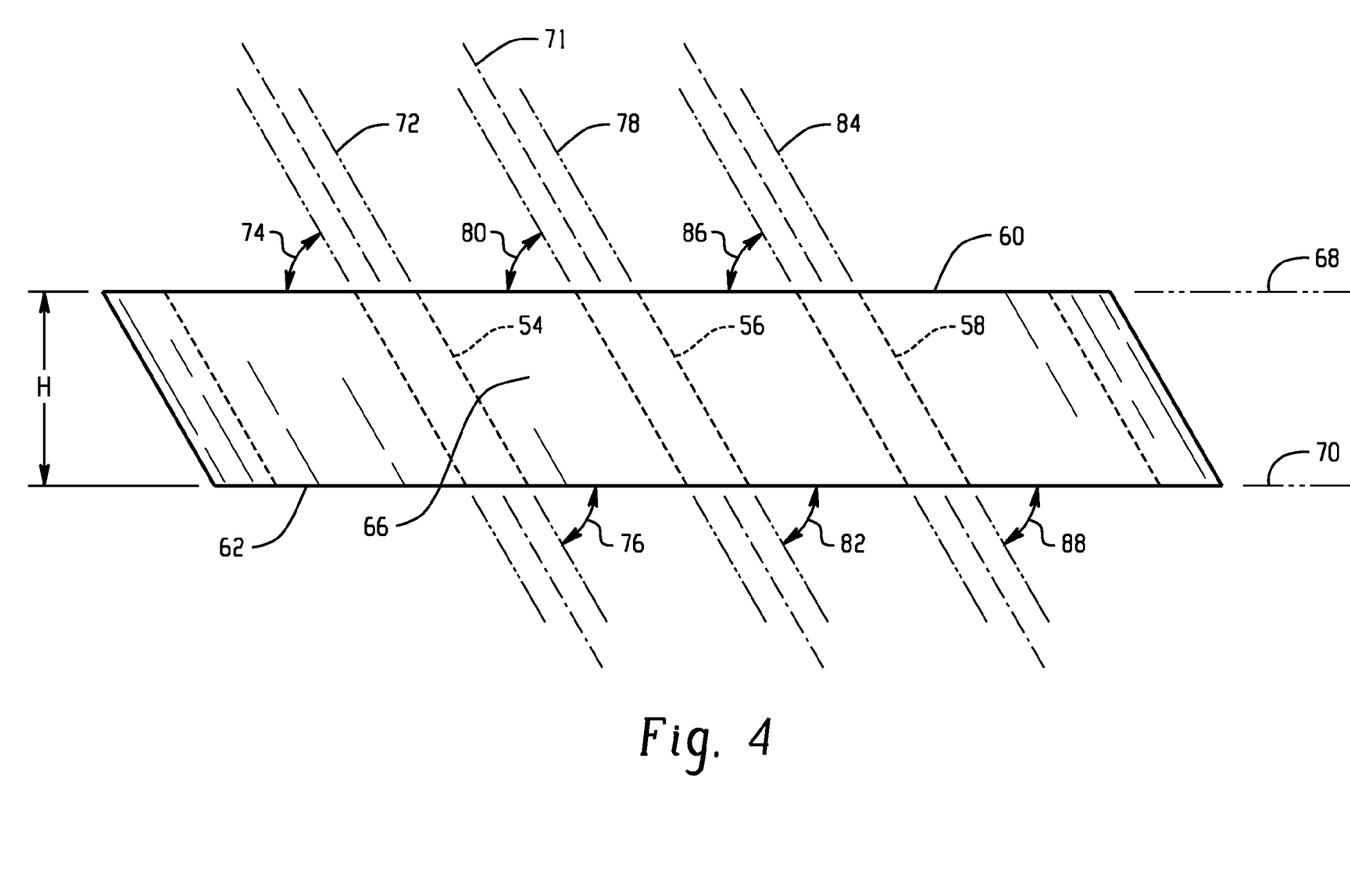
FIG. 4 is a side view of the packing element shown in FIG. 2.

Disclosed in FIGS. 2, 3 and 4 are a perspective view, a top view and a side view, as viewed from side S1, respectively, of an embodiment of a packing element 50. In FIG. 2, arrows T, B, S1, S2, S3 and S4 indicate the view from the top (T), bottom (B), first side (S1), second side (S2), third side (S3) and fourth side (S4). The packing element includes continuous peripheral wall 52, first internal wall 54, second internal wall 56 and third internal wall 58. The peripheral wall includes a first end 60, a second end 62, an interior surface 64 and an exterior surface 66. As shown in FIG. 4, the first end defines first planar surface 68 and the second end defines second planar surface 70. The packing element is symmetrically arranged around a hypothetical central axis 71 which passes through the center of the packing element and, in this embodiment, is parallel to second internal wall 56. The width, length and thickness of the first internal wall defines the location of first geometric plane 72 which includes the first internal wall and extends above and below the first and second planar surfaces as shown in FIG. 4. The first geometric plane intersects the first planar surface thereby forming acute angle 74 and a supplementary obtuse angle. As used herein, an acute angle is an angle less than 90° and acute angles such as 85°, 80°, 75°, 70°, 65°, 60°, 55°, 50°, 45°, 40°, 35° and 30° are feasible. The first geometric plane also intersects the second planar surface at angle 76 which is an acute angle. In this embodiment, angles 74 and 76 have the same numerical value because the first and second planar surfaces are mutually parallel. In a similar manner, second internal wall 56 defines second geometric plane 78 which intersects the first and second planar surfaces at acute angles 80 and 82, respectively. Third internal wall 58 defines third geometric plane 84 which intersects the first and second planar surfaces at acute angles 86 and 88

Referring now to FIG. 3, packing element 50 may be generally described as a skewed disc because the ratio of the element's maximum width, $W_{max}$, to the element's height, H in FIG. 4, is approximately 7:1 and, when placed on a horizontal surface, the top of the disc appears to be skewed either forward or backward relative to the bottom of the disc. In addition, when viewed from the top or bottom so that either the first or second planar surfaces are visible, the planar surfaces are oval. The ovality of the planar surfaces may be characterized by the ratio of the element's maximum width, $W_{max}$, to the element's minimum width, $W_{min}$, which is approximately 1.4:1.0. Packing elements of this invention that have a ratio of $W_{max}:W_{min}$ between 1.0:1.0 and 2.0:1.0 are feasible. Specifically, packing elements of this invention may have a ratio of $W_{max}:W_{min}$ that is at least 1.1:1.0 or 1.2:1.0. In one embodiment, an embodiment of this to invention may have a peripheral wall that comprises a number of short straight segments which intersect the first planar surface to form a polygon rather than an oval.

Figure 5:
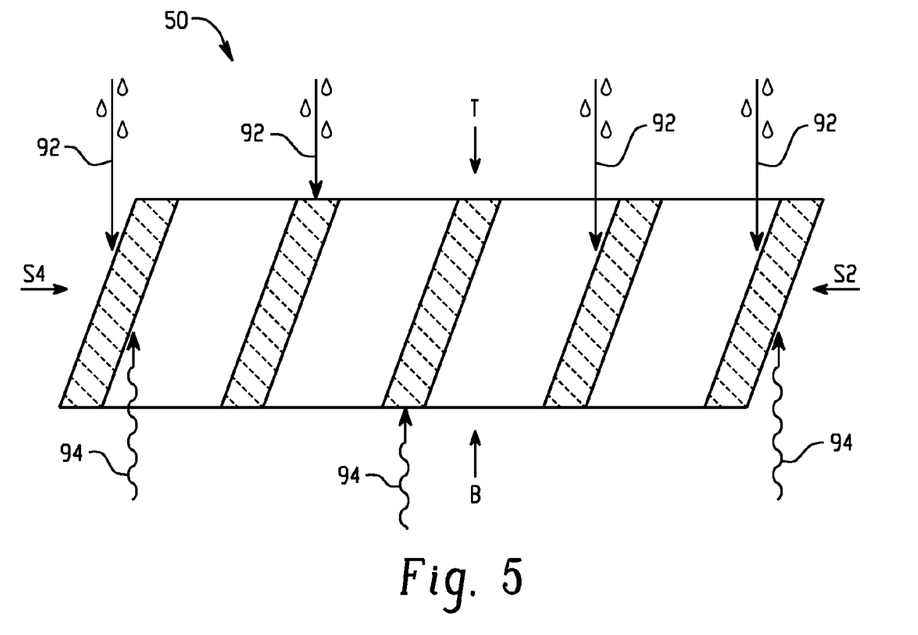
FIG. 5 is a cross-section, taken along line A-A, of the packing element shown in FIG. 2.

A common way to characterize packing elements is to measure the element's geometric surface area, which may be abbreviated herein as GSA, and then determine the amounts of vertically exposed surface area and vertically non-exposed surface area as percentages of the GSA. The GSA is the sum of all the packing element's surface areas including the peripheral wall's and the internal wall's (or walls') first and second ends and the walls' interior and exterior surfaces. As used herein, vertically exposed surface area is the portion of the geometric surface area that is directly exposed to a fluid falling vertically toward or rising vertically toward the packing element when the packing element's planar surfaces are perpendicular to the flow of the fluids. As shown in FIG. 5, which is a cross-section of packing element 50 shown in FIG. 2, most of the geometric surface area is directly exposed to one of the fluids flowing perpendicularly to the element's planar surfaces. The only portions of the GSA that are not vertically exposed are those small sections of the circumferential wall's interior and exterior surfaces that are perpendicular to the first and second planar surfaces. See arrows 89 and 91 in FIG. 3. Referring again to FIG. 5, arrows 92 represent a liquid flowing downwardly toward the packing element. The liquid can directly contact the first end of the packing element and portions of the interior walls' surfaces as well as portions of the peripheral wall's interior and exterior surfaces. Simultaneously, a gas, represented by arrows 94, rising toward the packing element can contact the second end of the packing element and portions of the interior walls' surfaces and peripheral wall's interior and exterior surfaces not directly available to the liquid. Due to the angular relationship between the element's planar surfaces and the peripheral and internal wall(s), most of the element's GSA is vertically exposed surface area. While packing element 50 has a geometric surface area that includes at least 95% vertically exposed surface area other embodiments of this invention may include a combination of vertically to exposed surface area and vertically non-exposed surface area wherein at least 50% but less than approximately 98% of the GSA may be vertically exposed surface area. While the exact amounts of vertically exposed surface area and vertically non-exposed surface area may be difficult to calculate precisely for some media due to the curvilinear shape of the media's walls due, the approximate ratio of the vertically exposed surface area to the vertically non-exposed surface area may be at least 2:1, 4:1, 10:1, 20:1 or even 50:1.

Figure 6:
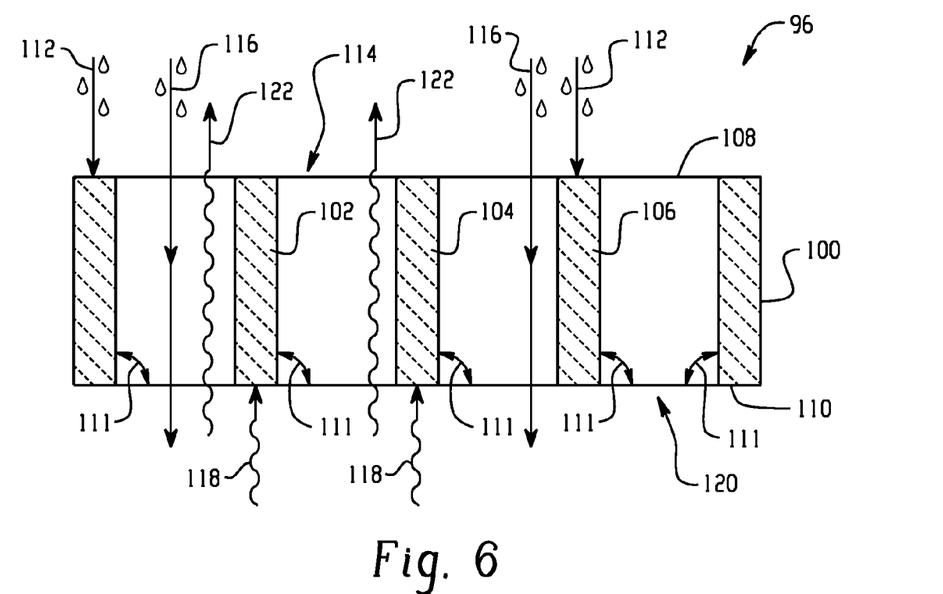
FIG. 6 is a cross-section of a conventional element.

In contrast to packing element 50 shown in FIG. 5, wherein approximately 98% of the GSA is vertically exposed, FIG. 6 discloses a cross-section of conventional packing element 96 wherein less than 50% of the GSA is vertically exposed. With regard to FIG. 6, peripheral wall 100 and internal walls 102, 104 and 106, all intersect first planar surface 108 and second planar surface 110 at a perpendicular angle. See arrows 111. Consequently, droplets of a liquid, represented by arrows 112, flowing downwardly toward the packing element can only directly contact the element's first end 114. Other droplets, represented by arrows 116, flow through the packing element's passageway and do not contact any portion of the element's surface. The interior and exterior surfaces of the peripheral and internal walls are not directly contacted by the falling droplets. Similarly, a gas, represented by arrows 118, rising toward the packing element can only directly contact the packing element's second end 120. Other portions 122 of the gas flow through the packing element's passageway and do not contact any portion of the element's surface. The interior and exterior surfaces of the peripheral and internal walls are not directly exposed to the gas. In some commercially available and randomly oriented ceramic packing elements that include a peripheral wall which defines a passageway through the element and an internal wall bisects the passageway, the amount of vertically exposed surface area does not exceed 50% of the element's GSA. In contrast, embodiments of packing elements of this invention can be designed so that at least 50% and up to approximately 98% of the GSA is vertically exposed surface area. Intermediate percentages of exposed surface area, such as at least 60%, 70%, 75%, 80% or 90%, are feasible.

Figure 7:
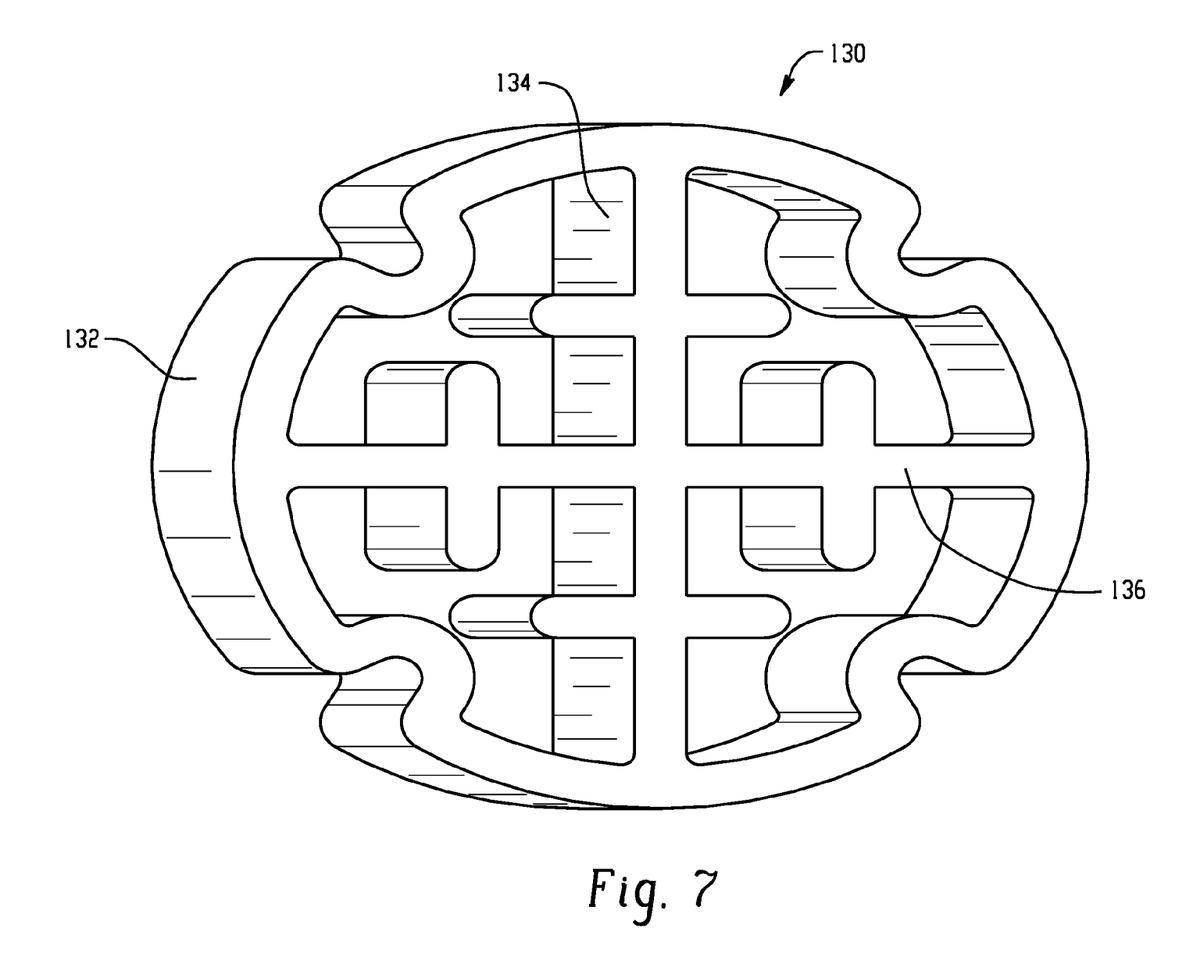
FIG. 7 is a perspective view of a second embodiment of a packing element of this invention.
Figure 8:
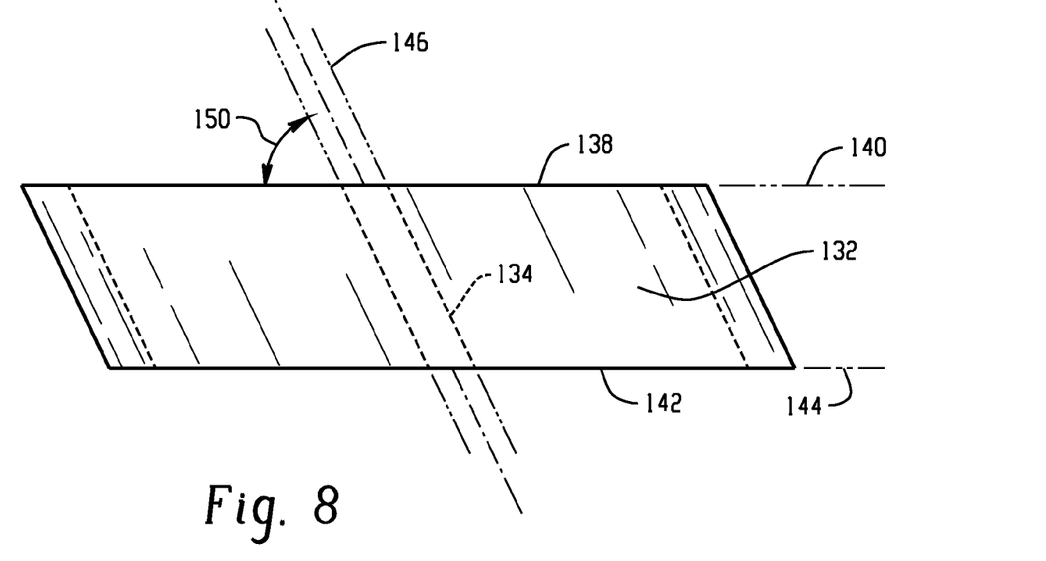
FIG. 8 is a first side view of the packing element shown in FIG. 7.
Figure 9:
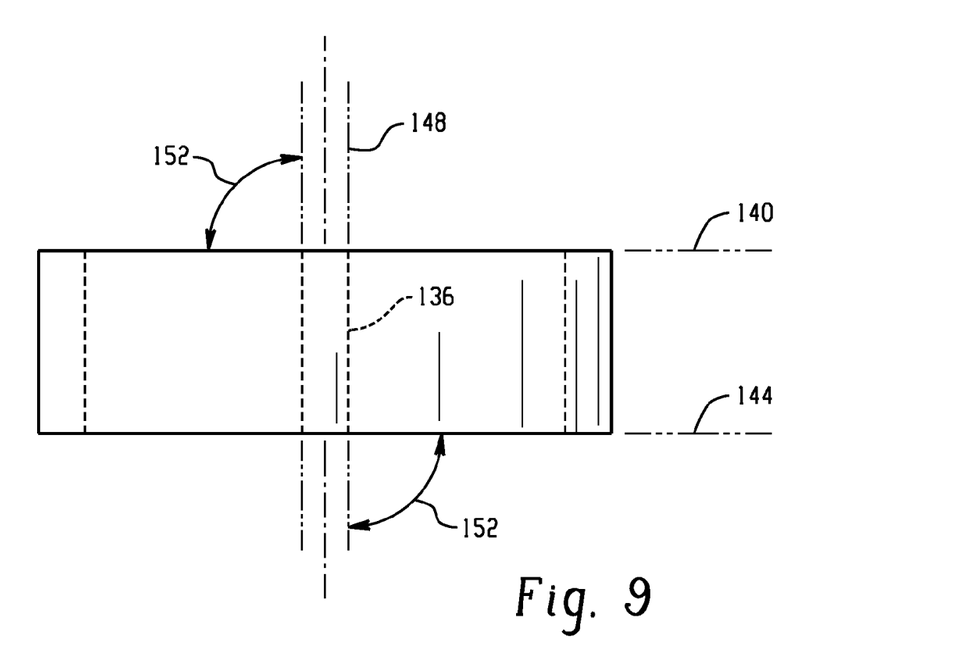
FIG. 9 is a second side view of the packing element shown in FIG. 7.

Shown in FIG. 7 is a perspective view of a second embodiment of a packing element of this invention. Packing element 130 in FIG. 7 includes a peripheral wall 132, a first internal wall 134 and a second internal wall 136. With regard to FIG. 8, the peripheral wall includes first end 138 which defines a first planar surface 140 and second end 142 which defines a second planar surface 144. Unlike the mutually parallel internal walls that form a part of packing element 50, see FIG. 2, internal walls 134 and 136 intersect one another within the passageway defined by continuous wall 132. The length, width and thickness of internal wall 134 defines first geometric plane 146 which intersects first planar surface 140 at acute angle 150. Geometric plane 146 of packing element 130 includes first internal wall 134 and extends above and below the first and second planar surfaces as shown in FIG. 8. Similarly, the width, length and thickness of second internal wall 136 defines the location of second geometric plane 148 which extends above and below the first and second planar surfaces, 140 and 144, as shown in FIG. 9. In FIG. 8, first geometric plane 146 intersects first planar surface 140 at acute angle 150. In contrast, second geometric plane 148 in FIG. 9 intersects first planar surface 140 and second planar surface 144 at perpendicular angle 152.

Figure 10A:
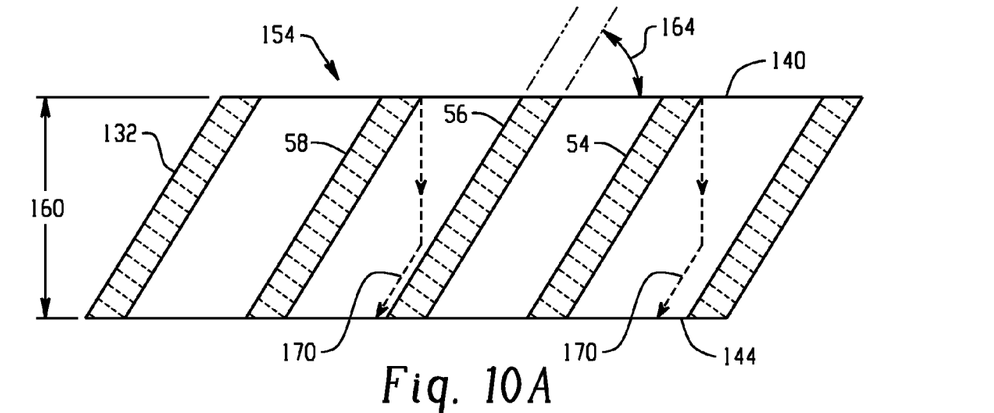
FIGS. 10A, 10B and 10C are cross-sections of packing elements according to embodiments of this invention.
Figure 10B:
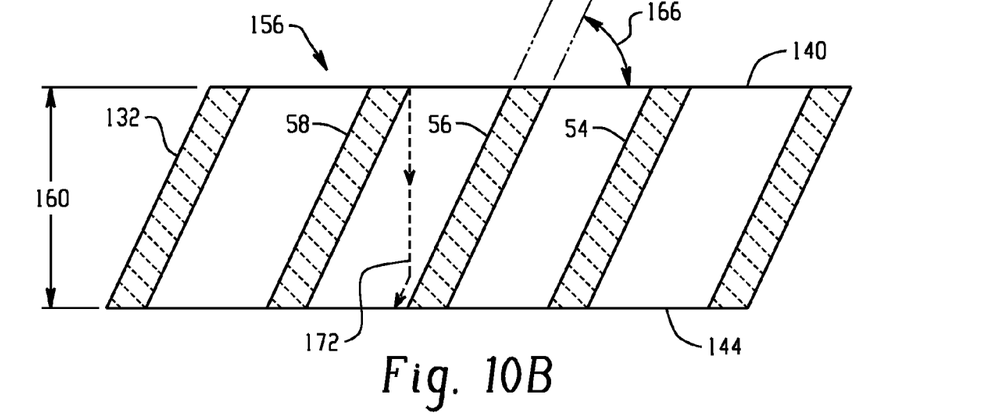
Figure 10C:
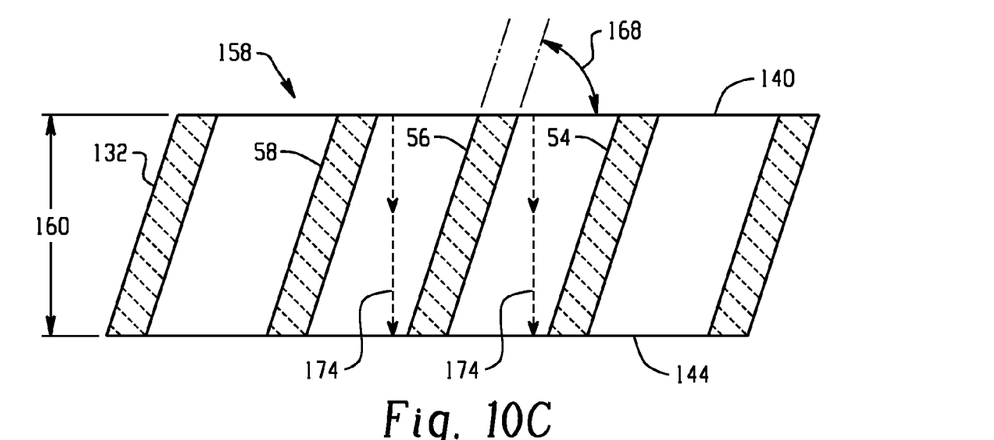

FIGS. 10A, 10B and 10C disclose three embodiments, 154, 156 and 158, respectively, of packing elements of this invention that differ only in the acute angle formed by their internal walls 54, 56, and 58 and first planar surfaces 140. Each of the packing elements has three internal walls, 54, 56 and 58 and the heights 160 of the packing elements are the same. In FIG. 10A angle 164 is approximately 60°. In FIG. 10B angle 166 is approximately 70° and in FIG. 10C angle 168 is approximately 80°. Dotted lines 170 in FIG. 10A represent an obstructed potential path for fluid flow through packing element 154 from first planar surface 140 to second planar surface 144. In FIG. 10A, fluid flowing at a perpendicular angle toward the packing element cannot pass through the element without striking an internal wall or a portion of the peripheral wall and then to flowing along the surface of the wall toward the second planar surface. Packing element 154 may be described as having no open face surface area which is used herein to describe the area of a packing element's first planar surface located above an unobstructed path through the packing element. Packing elements with 50% or more open face surface area, which may be attained with many conventional packing elements including the element disclosed in FIG. 6, generally have less pressure drop across a bed of packing elements than a bed of packing elements, like packing element 154, which have no open face surface area. FIG. 10B discloses packing element 156 which includes angle 166 that is approximately 10° larger than angle 164 in FIG. 154. By changing only the angle between the internal wall and the first planar surface, fluid flowing through packing element 156 is still obstructed but the length of fluid flow path 172 is reduced relative to the length of fluid flow path 170 in packing element 154. FIG. 10C discloses packing element 158 which includes angle 168 that is approximately 10° larger than angle 166 in element 156 and 20° larger than angle 164 in element 154. Increasing the angle formed by the internal wall and the first planar surface creates several unobstructed paths 174 through the packing element. The unobstructed paths create open face surface area which reduces the pressure drop caused by the bed of packing elements. When viewed collectively, FIGS. 10A, 10B and 10C visually disclose that a packing element's open face surface area can be increased or decreased by changing the angle between the element's internal wall(s) and the first planar surface. Changing only the angle between the internal wall and first planar surface alters the amount of the element's open face surface area which is a characteristic of the packing that may need to be altered to provide the desired pressure drop in a chemical processing apparatus. As will be described in the description of the processes used to manufacture packing elements of the invention, changing the angle between the internal wall and first planar surface can be achieved using conventional equipment such as extruders and extrudate cutting devices.

Figure 11A:
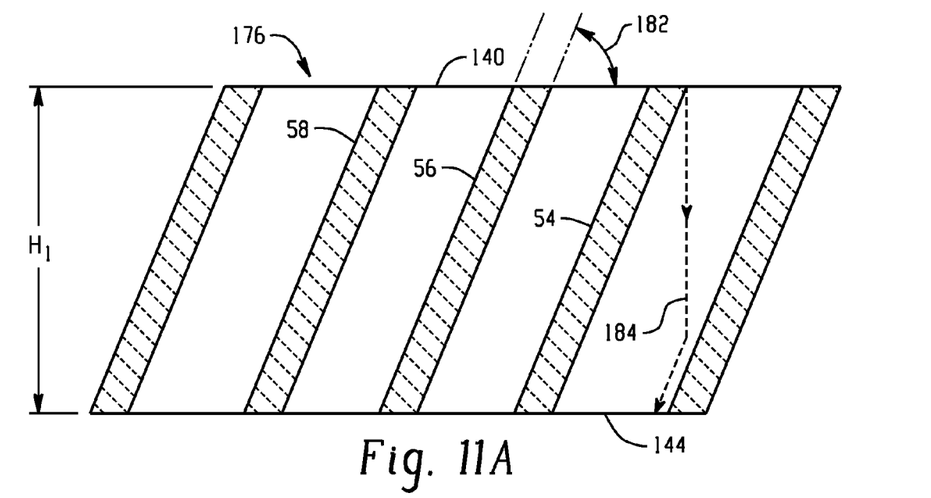
FIGS. 11A, 11B and 11C are cross-sections of packing elements according to embodiments of this invention.
Figure 11B:
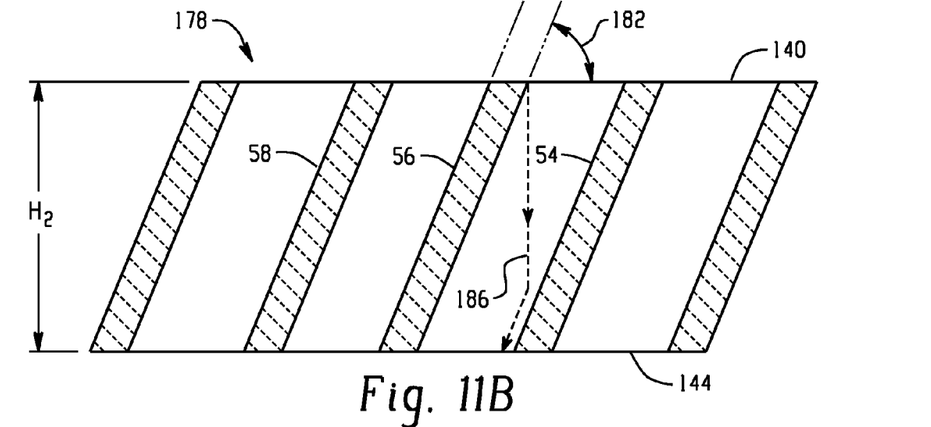
Figure 11C:
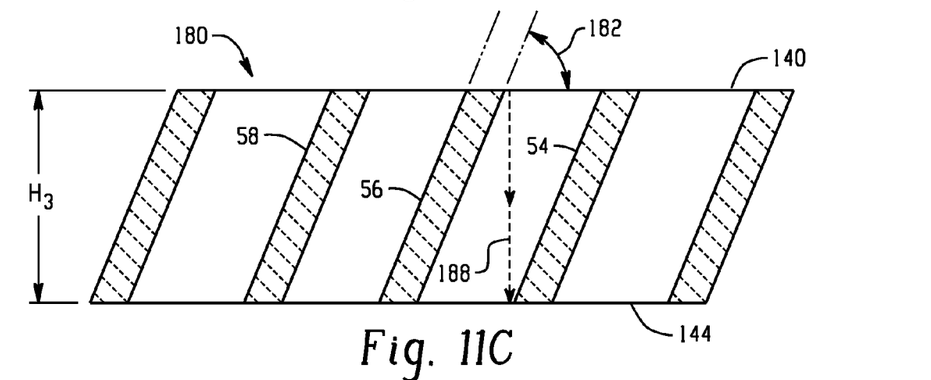

FIGS. 11A, 11B and 11C disclose three embodiments, 176, 178, and 180, respectively, of packing elements of this invention that differ only in the height of the packing elements. The number of internal walls in each element and the acute angle 182 formed by the internal wall 56 and first planar surface 140 are the same for all three embodiments. Packing element 176 has a height $H_1$ which is greater than the height $H_2$ of packing element 178 which, in turn, is greater than the height $H_3$ of packing element 180. In FIG. 11A, dotted line 184 represents an obstructed potential flow path through the packing element. Fluid that passes through the packing element from the first planar surface to the second planar surface must contact an internal wall or the peripheral wall and then flow along the wall in order to exit the packing element at the second planar surface. As illustrated in FIG. 11B, the length of the flow path, as represented by dotted line 186 can be reduced by decreasing the height of the packing element from $H_1$ in packing element 176 to $H_2$ in packing element 178. Dotted line 188 in FIG. 11C represents an unobstructed fluid flow path through the packing element and illustrates that reducing the height of the packing element from $H_2$ in packing element 178 to $H_3$ in packing element 180 creates open face surface area which, as described above, may reduce the pressure drop contributed by a bed of packing elements within a chemical processing apparatus.

Figure 12A:
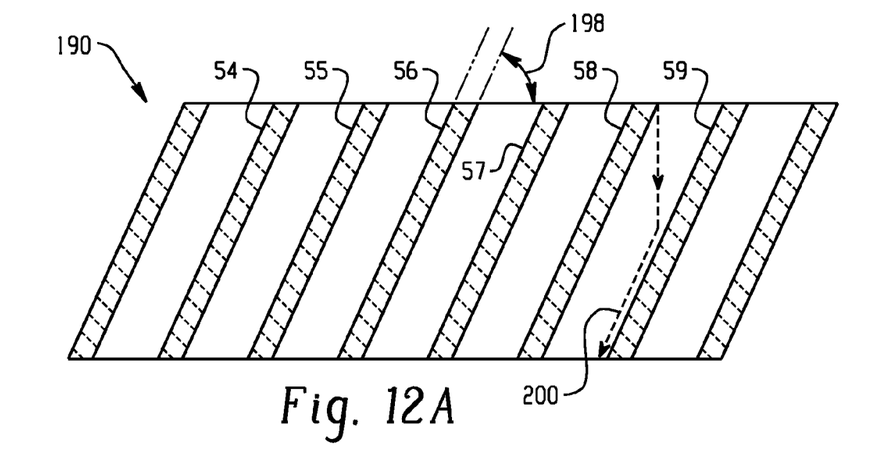
FIGS. 12A, 12B and 12C are cross-sections of packing elements according to embodiments of this invention.
Figure 12B:
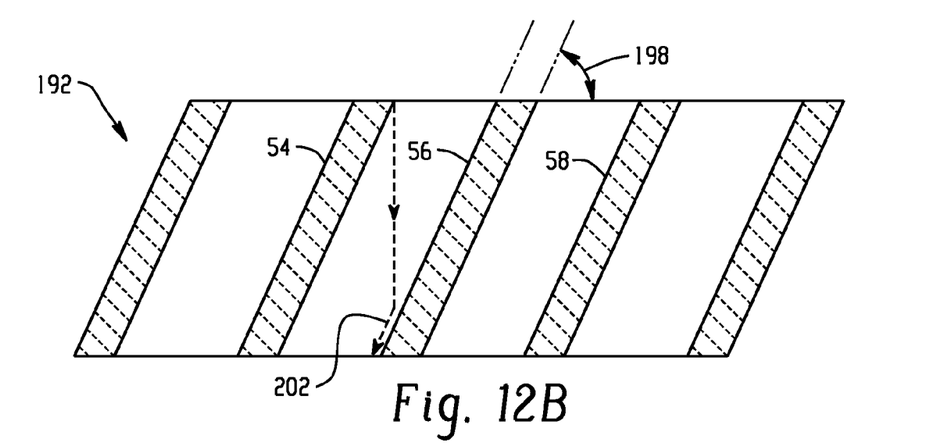
Figure 12C:
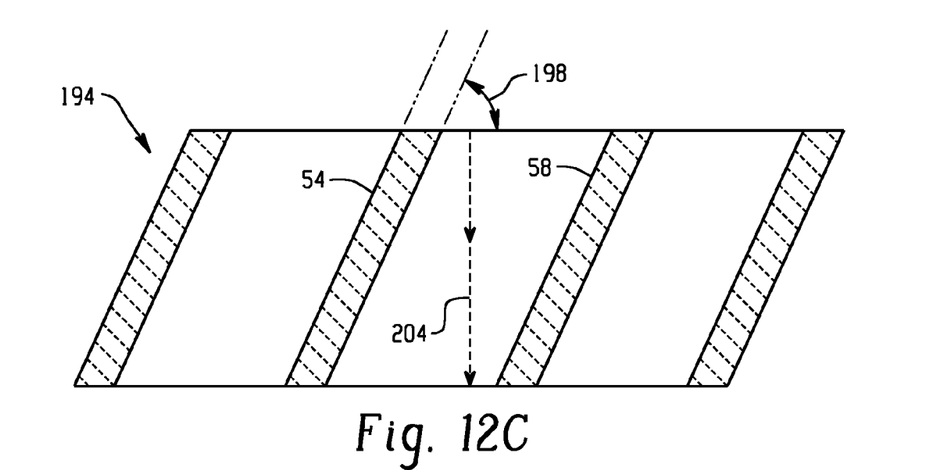

FIGS. 12A, 12B and 12C, disclose three embodiments, 190, 192, and 194, respectively, of packing elements of this invention that differ only in the number of walls in the packing elements. Each element has the same height 196 and the same angle 198 between the internal wall and first planar surface. Packing element 190 has six internal walls 54, 55, 56, 57, 58 and 59. Packing element 190 has only obstructed fluid flow paths, represented by dotted line 200, that allow fluid entering the packing element from the first planar surface to contact an internal wall or a portion of the peripheral wall and then flow along the wall before exiting the packing element at the second planar surface. Packing element 190 has no open face surface area. Packing element 192 has only three internal walls, 54, 56 and 58 and the fluid flow path, represented by dotted line 202, is shorter than fluid flow path 200 in FIG. 12A. FIG. 12C has only two internal walls, to 54 and 58. The fluid flow path 204 through packing element 194 allows fluid to pass unobstructed through the packing element. The unobstructed areas provide open face surface area which may reduce the pressure drop in a bed of packing elements in a first chemical processing apparatus compared to a second apparatus that utilizes a bed of packing elements disclosed in FIG. 12A or 12B.

FIGS. 10A-C, 11A-C and 12A-C disclose the impact of individually altering just: (a) the angle between the internal wall and first planar surface; (b) the length of the packing element; or (c) the number of internal walls. Each of these variables can be used to control the packing element's: open face surface area; geometric surface area; and amount of vertically exposed surface area. Control of the packing element's physical characteristics allows the manufacturer of the packing elements to tailor the performance of the packing elements to the design characteristics of the chemical processing apparatus. Consequently, one packing element may afford optimum performance in a first apparatus while a second packing element, which is substantially different from the first packing element, may afford optimum performance in a second apparatus.

Figure 13:
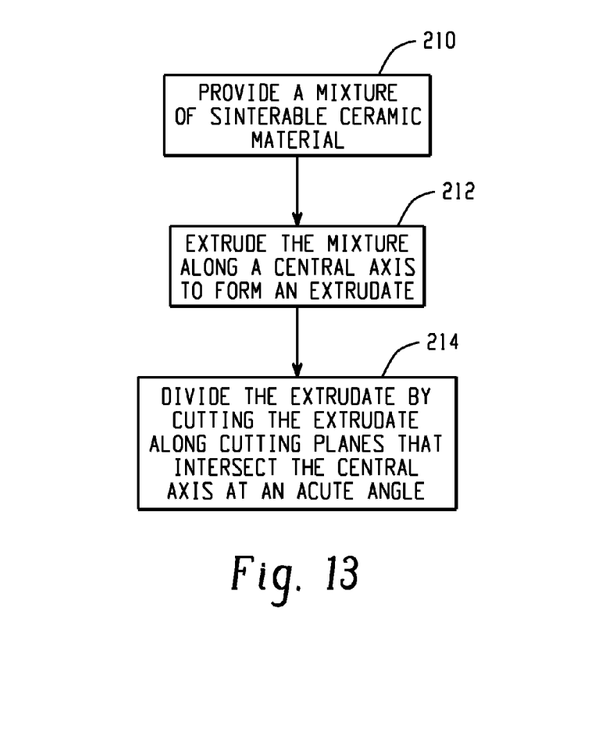
FIG. 13 is a process flow chart of one embodiment of a process for manufacturing packing elements.

Packing elements of this invention may be manufactured by a first process that uses an extruder and an extrudate cutting apparatus. As shown in FIG. 13, step 210 represents providing a mixture of sinterable ceramic materials. Step 212 represents extruding the mixture along a central axis to form an extrudate. The extrudate includes a peripheral wall that surrounds a passageway therethrough. If a first internal wall is disposed within the passageway, then the first wall defines a first geometric plane. Step 214 represents dividing the extrudate into a plurality of elements by cutting the extrudate along cutting planes which intersect the central axis at an acute angle.

With regard to step 210, a suitable mixture of sinterable ceramic materials can be formed from any material that provides sufficient strength and is compatible with the materials disposed in the chemical processing apparatus. The sinterable ceramic materials may be extrudable materials. Suitable sinterable ceramic materials include natural or synthetic clays, feldspars, zeolites, cordierites, aluminas, zirconia, silica or mixtures of these. Clays are generically mixed oxides of alumina and silica and include materials such as kaolin, ball clay, fire clay, china clay, and the like. Example clays are high plasticity clays, such as ball clay and fire clay. The clay may have a methylene blue index, ("MBI"), of about 11 to 13 meq/100 gm. The term "feldspars" is used herein to describe silicates of alumina with soda, potash and lime. With regard to zeolites, some of the more common mineral zeolites are analcime, chabazite, clinoptilolite, heulandite, natrolite, phillipsite, and stilbite. A cordierite is a magnesium iron aluminum cyclosilicate. Other components such as quartz, zircon sand, feldspathic clay, montmorillonite, nepheline syenite, and the like can also be present in minor amounts. The ceramic materials may be heated to produce packing elements of embodiments of this invention. The ceramic materials may be supplied in fine powder form and may be made into a mixture by the addition of a liquid, such as water, and optional processing aids, such as bonding agents, extrusion aids, lubricants, and the like.

The mixture can be processed using techniques, such as extrusion, slip casting, wet pressing, dry pressing and injection molding to achieve the desired shape. While extrusion of ceramic materials will be described below with reference to FIG. 14, non-extrusion techniques, such as slip casting, wet and dry pressing, and injection molding can be used to produce greenware packing elements having the desired characteristics. Non-extrusion techniques may use a mold which is filled with a compactable material such as a wet or dry mixture. One or more compaction members may then compress the compactable material within the mold to produce a packing element having the desired shape. The greenware packing element may be removed from the mold and then sintered to form a ceramic packing element.

Figure 14:
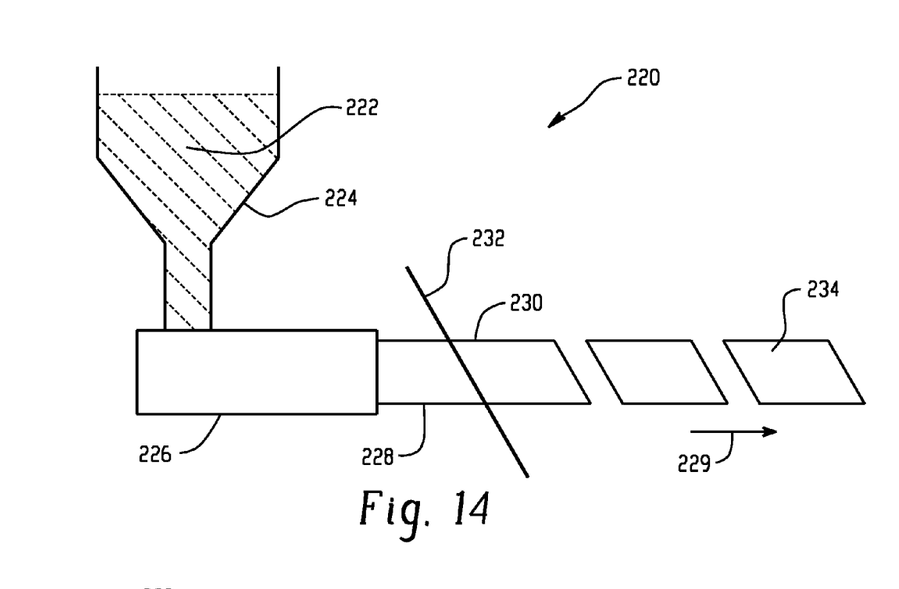
FIG. 14 is a schematic representation of an extrusion and a first extrudate dividing process.
Figure 15:
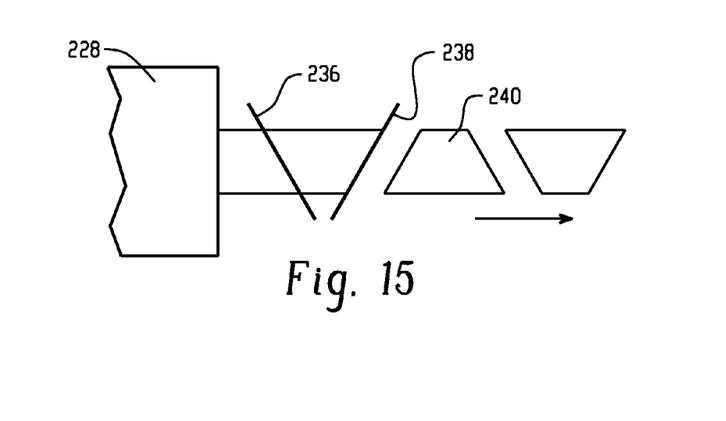
FIG. 15 is a top view of a second extrudate dividing process.

FIG. 14 is a schematic representation of an extrusion operation 220 which includes ceramic mixture 222 disposed within feeding apparatus 224. During the extrusion process, the mixture is forced through extruder 226 which may use an auger to force the mixture through die 228 which defines the location and to thickness of an extrudate's peripheral wall and internal wall(s). The peripheral wall surrounds a passageway which is bisected by one or more internal walls that divide the passageway into two or more subpassageways. Extrudate 230 exits the extruder as a continuous, elongated member that has a central axis. In conventional packing element manufacturing processes, the extrudate may be cut along cutting planes that are perpendicular to the extrudate's central axis which insures that the internal wall will be perpendicular to the element's first and second planar surfaces thereby resulting in a packing element like the element shown in FIG. 6. As shown in FIG. 14, and in direct contrast to conventional packing element manufacturing processes, packing elements of this invention are made by cutting the extrudate along cutting planes 232 that intersect the extrudate's central axis at an acute angle such as 85°, 80°, 75°, 70°, 65°, 60°, 55°, 50°, 45°, 40°, 35° or 30°. The cutting planes create the first and second planar surfaces. In all of the embodiments of packing elements of this invention disclosed above, the first and second planar surfaces are mutually parallel thereby insuring that the resulting packing element has a consistent height. However, as shown in FIG. 15, the extrudate could be cut alternately by two different cutters 236 and 238 which intersect the extrudate's central axis at acute and non-parallel angles thereby insuring that the height of the packing element varies across the width of the element. Packing element 240 in FIG. 15 is an example of a packing element wherein the first planar surface insects the packing element's central axis at a first acute angle and the second planar surface intersects the packing element's central axis at a second acute angle. In particular embodiments, the cutting mechanism used to cut the extrudate may be a wire or a stream of liquid forced rapidly from a nozzle under high pressure. If a wire is used to cut the extrudate, the wire may be held taunt and forcefully moved through the extrudate. The extrudate may be cut in a series of individual cuts or a cutting device that uses several wires to execute multiple cuts simultaneously.

After cutting extrudate comprising sinterable ceramic material into a plurality of unfired packing elements commonly know as greenware, the to greenware is exposed to an initial drying step which may be used to drive off water. Removing the water may avoid disrupting the relatively weak structure of the greenware and may be carried out at below about 120° C. and, in one embodiment, below about 70° C. and may last for about 5 hours. The greenware may then be processed at high temperatures wherein the maximum temperature may be greater than 1100° C. and less than 1400° C. Maximum firing temperatures between 1200° C. and 1250° C. are common for certain types of sinterable ceramic material. The firing temperature may depend, to some degree, on the composition of the packing elements, and in general, may be sufficient for the bulk of the material to achieve a structurally sound body.

Processes used to produce packing elements of this invention enable the production of packing elements that can be readily customized to tailor the performance of a chemical processing apparatus. For example, if a first chemical processing apparatus uses a conventional packing element, such as packing element 96 shown in FIG. 6, and there is a desire to increase the process efficiency of the apparatus by increasing the vertically exposed surface area per packing element without increasing the packing element's height, diameter or number of internal walls, packing element 156 could be manufactured by forming the extrudate used to make the conventional packing element but then dividing the extrudate into a plurality of uniformly shaped packing elements wherein the packing element's first geometric plane intersects the element's first and second planar surfaces at an acute angle. The angle at which the first geometric plane intersects the element's first and second planar surfaces can be readily adjusted as needed during the manufacturing process. In another example, if a second chemical processing apparatus uses a conventional packing element and there is a desire to use a packing element that has a higher geometric surface area per element and higher vertically exposed surface area per element, a packing element similar to packing element 176 shown in FIG. 11A could be manufactured by forming the extrudate used to make the conventional packing element but then dividing the extrudate into a plurality of uniformly shaped packing elements to wherein the packing element's first geometric plane intersects the element's first and second planar surfaces at an angle and the distance between the cutting planes is increased, relative to the distance used to make the conventional elements, thereby creating packing elements that have a higher percentage of vertically exposed surface area, expressed as a percentage of the element's geometric surface area, and a greater height than the conventional elements. In summary, packing elements made by dividing the extrudate so that the extrudate's first geometric plane intersects the first end's planar surface at an acute angle offer a degree of flexibility to designers of packing elements that is not available when the extrudate is divided in a conventional manner wherein the first geometric plane intersects the first end's planar surface at a perpendicular angle.

Packing elements of this invention may be made from sinterable ceramic materials. While mass transfer packing elements made from plastic or metal are known in the art and may be easy to manufacture in complex shapes, ceramic packing elements may be preferred in certain processes that expose the packing elements to chemicals, such as acids or bases, that would destroy packing elements made of plastic or metal. Similarly, ceramic packing elements may be the only viable materials from which to make packing elements that are used in processes where the operating temperature exceeds the minimum temperatures needed to combust the plastic or melt the metal. Consequently, ceramic packing elements of this invention may have greater utility in a larger number of vessels that form a part of a chemical processing apparatus.

The above description is considered that of particular embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law.

What is claimed is:

1. A mass transfer packing element, comprising:
 (a) a continuous peripheral wall comprising a first end and a second end, wherein said peripheral wall surrounds a passageway through said element, said first end defines a first planar surface and said second end defines a second planar surface
 (b) disposed within said passageway a first internal wall defines a first geometric plane and a second internal wall defines a second geometric plane; wherein said first and second geometric planes are mutually parallel and intersect said first and second planar surfaces at an acute angle; and
 (c) said peripheral wall and said internal walls comprise ceramic material.

2. The packing element of claim 1 wherein said first geometric plane intersects said first planar surface at an angle less than 80°.

3. The packing element of claim 1 wherein said first geometric plane intersects said first planar surface at an angle less than 70°.

4. The packing element of claim 1 wherein said first geometric plane intersects said first planar surface at an angle less than 60° and greater than 30°.

5. The packing element of claim 1 wherein said first and second planar surfaces are mutually parallel.

6. The packing element of claim 1 wherein said element has a maximum width, $W_{max}$, a minimum width, $W_{min}$, and the ratio of $W_{max}:W_{min}$ is at least 1.1:1.0.

7. The packing element of claim 6 wherein said ratio of $W_{max}:W_{min}$ is at least 1.2:1.0.

8. The packing element of claim 6 further comprising a height H, which is the minimum distance between said first planar surface and said second planar surface, wherein the ratio of $W_{max}$:H is between 2:1 and 10:1.

9. The packing element of claim 8 wherein the ratio of $W_{max}$:H is between 3:1 and 7:1.

10. The packing element of claim 1 wherein the shape of said second planar surface is non-circular.

11. The packing element of claim 1 having a total geometric surface area comprising vertically exposed surface area and vertically non-exposed surface area wherein at least 50 percent of the total geometric surface area is vertically exposed surface area.

12. The packing element of claim 11 wherein the ratio of exposed surface area to non-exposed surface area is at least 2:1.

13. The packing element of claim 11 wherein the ratio of exposed surface area to non-exposed surface area is at least 4:1.

14. A process for manufacturing mass transfer packing elements comprising the steps of:
 (a) providing a mixture of sinterable, ceramic materials;
 (b) extruding the mixture along a central axis to form an extrudate, said extrudate comprising a peripheral wall which surrounds a passageway therethrough, a first internal wall and a second internal wall disposed within said passageway, said first internal wall defines a first geometric plane, said second internal wall defines a second geometric plane;
 (c) dividing said extrudate into a plurality of uniformly shaped packing elements by cutting said extrudate along cutting planes which intersect said central axis at an acute angle, thereby forming a first end which defines a first planar surface and a second end which defines a second planar surface; wherein said first and second geometric planes intersect said first and second planar surfaces at an acute angle and said geometric planes defined by said first and second internal walls are mutually parallel; and
 (d) sintering said uniformly shaped packing elements.

15. The process of claim 14 wherein at least one of said cutting planes and said central axis form an angle less than 80°.

16. The process of claim 14 wherein at least one of said cutting planes and said central axis form an angle less than 70°.

17. The process of claim 14 wherein at least one of said cutting planes and said central axis form an angle less than 60° and greater than 30°.

18. The process of claim 14 wherein at least two of said cutting planes are mutually parallel.

19. The process of claim 14 wherein all of said cutting planes are mutually parallel.

20. The process of claim 14 wherein said cutting comprises a cutting member selected from the group consisting of a wire and a liquid.

21. The process of claim 20 wherein said cutting comprises two cutting members simultaneously cutting said extrudate.

22. The process of claim 20 wherein said cutting comprises moving said wire through said extrudate.

23. A process for manufacturing mass transfer packing elements comprising the steps of:
 (a) providing a mixture of sinterable, ceramic materials;
 (b) extruding the mixture along a central axis to form an extrudate, said extrudate comprising a peripheral wall which surrounds a passageway therethrough;
 (c) dividing said extrudate into a plurality of uniformly shaped packing elements by cutting said extrudate along cutting planes which intersect said central axis at an acute angle wherein said cutting comprises selecting a cutting member selected from the group consisting of a wire and a liquid and rapidly forcing said liquid through said extrudate.

24. A chemical processing apparatus comprising a vessel, said vessel comprises a first fluid entry point, a second fluid entry point, a fluid exit point and a bed of randomly oriented packing elements disposed between said first and second entry points, wherein at least a majority of said packing elements each comprise a continuous peripheral wall comprising a first end and a second end, wherein said peripheral wall surrounds a passageway through said element and said first end defines a first planar surface; and disposed within said passageway, a first internal wall defines a first geometric plane and a second internal wall defines a second geometric plane, said geometric planes are mutually parallel and intersects said first planar surface at an acute angle.

25. The chemical processing apparatus of claim 24 wherein said bed of packing elements consists essentially of said packing elements.

26. The chemical processing apparatus of claim 24 wherein said bed of packing elements consists of said packing elements.

* * * * *